(12) United States Patent
Chang et al.

(10) Patent No.: US 10,194,129 B2
(45) Date of Patent: Jan. 29, 2019

(54) METHOD OF TAKING PICTURES FOR GENERATING THREE-DIMENSIONAL IMAGE DATA

(75) Inventors: Wen-Chin Chang, Taipei (TW); Tien-Hsiang Chen, Taichung (TW); Chin-Chien Chang, New Taipei (TW)

(73) Assignee: CHIH-CHING DEPTH X DEEP DIMENSIONS CO., Taipei (TW)

( * ) Notice: Subject to any disclaimer, the term of this patent is extended or adjusted under 35 U.S.C. 154(b) by 731 days.

(21) Appl. No.: 13/329,321

(22) Filed: Dec. 18, 2011

(65) Prior Publication Data
US 2012/0162390 A1 Jun. 28, 2012

(30) Foreign Application Priority Data
Dec. 24, 2010 (TW) .............................. 99145867 A

(51) Int. Cl.
*H04N 13/271* (2018.01)
*H04N 13/02* (2006.01)

(52) U.S. Cl.
CPC ..... *H04N 13/0253* (2013.01); *H04N 13/0271* (2013.01)

(58) Field of Classification Search
None
See application file for complete search history.

(56) References Cited

U.S. PATENT DOCUMENTS

| 6,147,760 A * | 11/2000 | Geng | G01B 11/2509 |
| | | | 356/3.01 |
| 2002/0148947 A1* | 10/2002 | Kakiuchi | G03B 15/03 |
| | | | 250/208.1 |
| 2003/0043277 A1* | 3/2003 | Kamon | H04N 13/0207 |
| | | | 13/207.99 |
| 2003/0235338 A1* | 12/2003 | Dye | G06T 9/00 |
| | | | 382/232 |
| 2004/0046737 A1* | 3/2004 | Numazaki | G06F 3/011 |
| | | | 345/156 |

(Continued)

OTHER PUBLICATIONS

MT9M114, ⅙-inch 720p High-Definition (HD) System-On-a-Chip (SOC) Digital Image Sensor, Dec. 2016.*

(Continued)

*Primary Examiner* — Dakshesh D Parikh
(74) *Attorney, Agent, or Firm* — Muncy, Geissler, Olds & Lowe, P.C.

(57) ABSTRACT

A method of taking pictures for generating three-dimensional image data is disclosed. The method includes continuously illuminating a target object with an environmental light; using an image sensor to receive the light reflected from the target object to generate a first electrical image signal; illuminating the target object with an active light generated from an active light source unit during the period of exposure by the environmental light; using the same image sensor to receive another reflected light to generate a second electrical image signal; using an image processing unit to receive the first and second electrical image signals, convert the first electrical image signal to a two-dimensional image data, and subtract the first electrical image signal from the second electrical image signal to generate three-dimensional depth data; and combining the two-dimensional image data and the three-dimensional depth data to generate the three-dimensional image data.

8 Claims, 2 Drawing Sheets

(56) References Cited

U.S. PATENT DOCUMENTS

2005/0060899 A1* 3/2005 Jackson .............. G01B 11/2755
33/203.18
2010/0134047 A1* 6/2010 Hasnain .............. F21V 23/0442
315/302

OTHER PUBLICATIONS

MT9M111 CMOS Camera Module (Micron MT9M111I29STC ⅓-Inch SOC Megapixel CMOS Digital Image Sensor Product Specifications, © 2004.*

* cited by examiner

METHOD OF TAKING PICTURES FOR GENERATING THREE-DIMENSIONAL IMAGE DATA

BACKGROUND OF THE INVENTION

1. Field of the Invention

The present invention generally relates to a method of taking pictures for generating three-dimensional image data, and more specifically to using the light generated by the active light source unit to illuminate the target object while illuminated by the environmental light.

2. The Prior Arts

Generally, the three-dimensional camera system consists of two independent two-dimensional cameras which are configured by a specific displacement pitch, faced towards the target object, and taking pictures so as to simultaneously generate two independent images, similar to the vision mechanism of human eyes. That is, the parallax information through the calculation of the independent images from these two plane cameras is similar to the visional depth perceived by human eyes. Then, these two independent images can be stored in the suitable storage medium, such as magnetic disk, movie tape or electronic memory.

However, the above-mentioned method in the prior arts for generating the three-dimensional image usually needs certain mechanical structure with very precise standard for mass production. Otherwise, the problem of depth map possibly results from the error of the relative positions and angles for the cameras. The method for generating the three-dimensional image is primarily based on the specific calculation related to right and left eyes, and it thus leads to high cost of calculation and needs some high performance CPU (central processing unit) to implement.

Therefore, a method of taking pictures for generating three-dimensional image data with only one camera to eliminate the requirement of high precise mechanic structure in mass production has been greatly desired. The cost of calculation is reduced, and the output of the depth image as well as the color image is thus obtained.

SUMMARY OF THE INVENTION

A primary objective of the present invention is to provide a method of taking pictures for generating three-dimensional image data through an active light source unit, an optical unit, an image sensor, and an image processing unit.

The method in accordance with the present invention comprises continuously illuminating a target object with an environmental light; using an image sensor to receive the light reflected from the target object to generate a first electrical image signal; using an active light generated by an active light source unit to illuminate the target object while illuminated by the environmental light; using the same image sensor to receive another reflected light from the target object for the active light to generate a second electrical image signal, wherein the exposure interval for the image sensor is the exposure interval for the second electric image signal; using an image processing unit to receive the first and second electrical image signals and perform image processing by converting the first electrical image signal to a two-dimensional image data, and subtracting the first electrical image signal from the second electrical image signal to generate a three-dimensional depth signal which is converted to a three-dimensional depth data; and combining the two-dimensional image data and the three-dimensional depth data to generate the three-dimensional image data. Finally, an output having a depth image together with a color image is thus obtained.

The algorithm in the method of the present invention is implemented for fast switched active light source units, such as light-emitting diodes (LEDs), instead of slowly switched light source units, like conventional light bulbs. The so-called "fast switched" is usually determined by the frame rate of the image sensor. For example, if the frame rate is set 30 FPS (frame per second), it usually takes about 33 ms for each frame of picture, and the switching rate of the active light source unit has to be faster than that of the period of 33 ms so as to assure that the amount of exposure for the image sensor is sufficient. Therefore, the switching operation of the active light source unit has to be synchronized with the start and end points of time for the exposure of the image sensor, like the vertical synchronized signal. The real-time property and the capability of noise resistance for the output of depth data are improved and increased.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
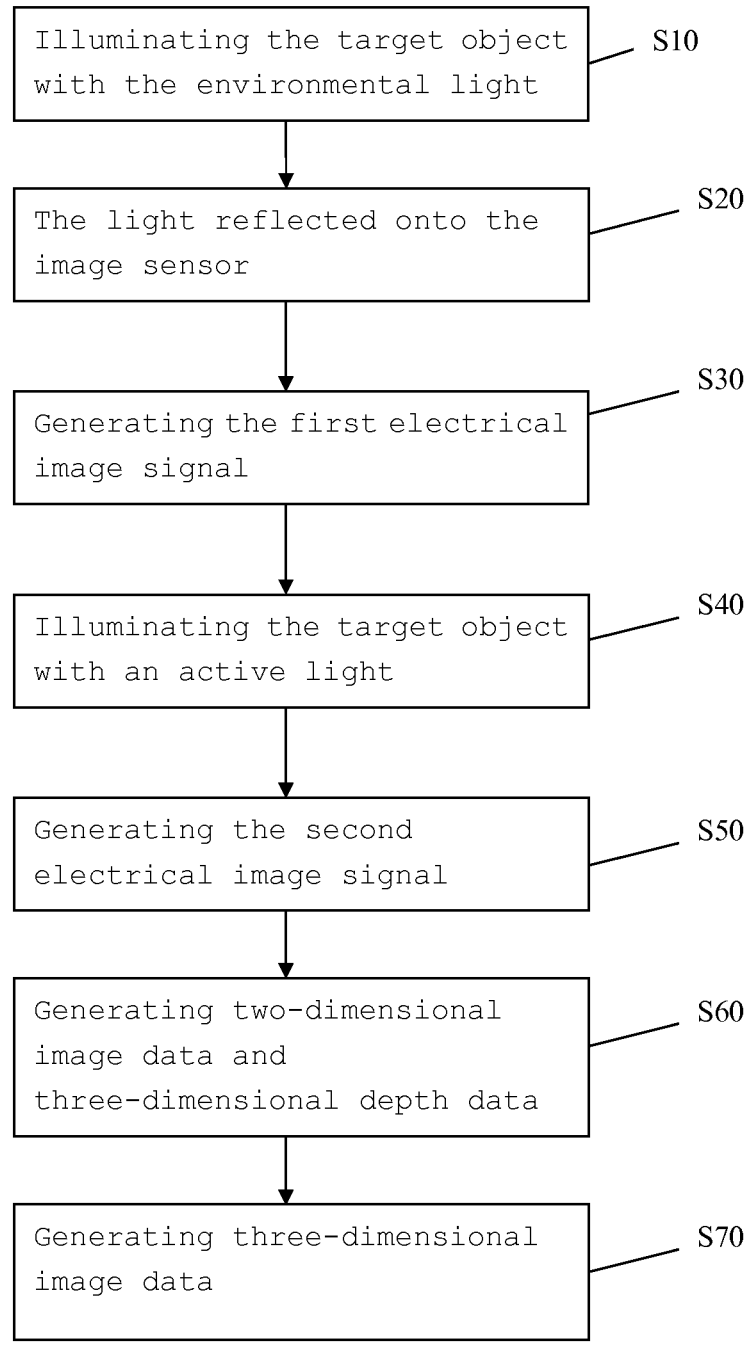
FIG. 1 is a flow chart to illustrate the processes of the method according to the present invention.
Figure 2:
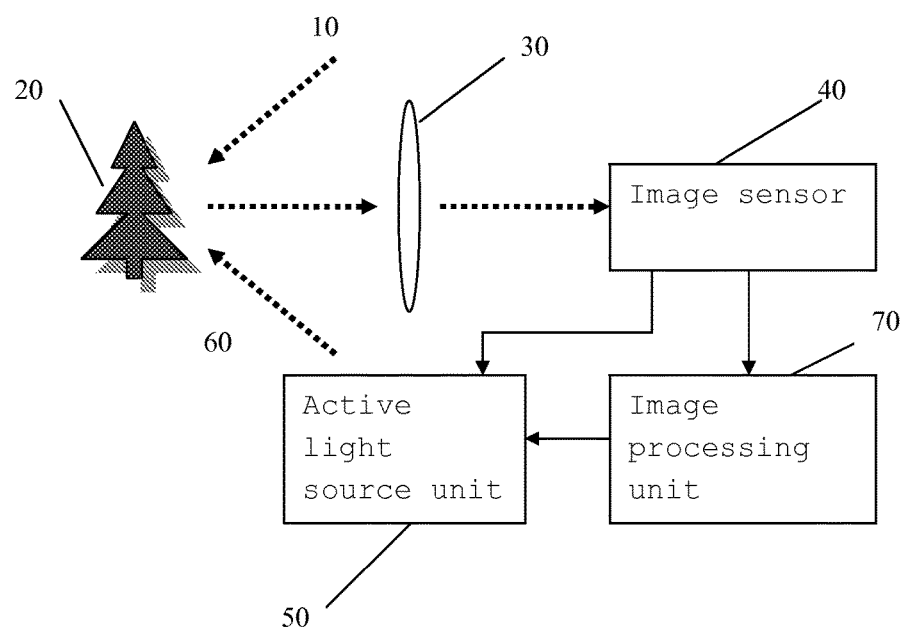
FIG. 2 shows a system diagram to illustrate the method according to the present invention.

Please refer to FIGS. 1 and 2, showing the flow chart and the schematic system diagram for the method of taking pictures for generating three-dimensional image data according to the present invention, respectively. As shown in FIG. 1, the method of the present invention first starts in the step S10 by illuminating the target object 20 with the environmental light 10 to generate the first image reflected light reflected from the target object 20.

Then, in the step S20, the first image reflected light is incident onto the image sensor 40 through the optical unit 30, which may comprise transparent optical glass or lens. The image sensor 40 may comprise a conventional a CMOS or CCD (charge coupled device). Next, the image sensor 40 receives the first image reflected light and generate the first electrical image signal in the step S30.

The step S40 is performed later by using the active light source unit 50 to generate the active light 60 illuminating the target object 20, which is continuously illuminated by the environmental light 10 during the exposure (based on the synchronized signal for the exposure). The active light 60 is reflected by the target object 20 to form the second image reflected light. The active light 60 has a specific range of wavelength which can pass through the optical unit 30 or be filtered by the optical unit 30 such that the capability of noise resistance at a long distance outdoors increases. Moreover, it is preferred to use the active light source unit 50 with lower power consumption.

The above active light source unit 50 may comprise light emitting diodes (LEDs) or laser, and the active light 60 has a specific range of wavelength, covering at least one of visible, ultraviolet, and infrared light. The flickering frequency of the active light 60 is less than the frame rate (such as frame per second (FPS)) of the image sensor 40, and the flickering frequency is maintained as a constant ratio which can be set as desired. The range of the constant ratio can be set as any real number between 0 and 1, but not 0 or 1. After the constant ratio is set, the integral of intensity of the active light 50 within a second is substantially not changed, and proportional to the constant ratio. If the constant ratio is set higher than 0.5 and the image sensor 40 with a frame rate of 60 FPS is installed, the active light 60 generated by the active light source unit 50 should have the flickering frequency more than 30 per second. It is primarily intended that human eyes can not perceive the flicker in the active light 60 when the active light source unit 50 able to generate visible light is used. Further, if the active light source unit 50 generating infrared light and the image sensor 40 with 30 FPS are employed, the constant ratio can be set less than 0.5 to cause the flickering frequency less than 15 per second such that the flicker induced is also not perceivable to human eyes because infrared light is substantially invisible. However, the shortcoming is that the property of the real time is slower than the former by one time. If both features should be met, it is preferred to use the image sensor 40 with a frame rate higher than 60 FPS, and the active light source unit 50 with invisible light, such as infrared light.

Furthermore, the switching on/off of the active light source unit 50 is based on the synchronized signal related to the exposure of the image sensor 40 to derive the suitable points of time to start and end so as to meet the image sensor 40 with different specifications and designs. As shown in FIG. 2, the active light source unit receives the synchronized signal transmitted from the image sensor.

The intensity of the environmental light 10 can be sustained without any change within a variable interval of time, but vary out of the variable interval of time. Specifically, the intensity of the environmental light 10 has a variable frequency. The active time interval of exposure for the active light source unit 50 is less than the variable interval of time for the environmental light 10. That is, the flickering frequency of the active light 60 should be higher or equal the variable frequency of the intensity of the environmental light 10.

Later, the step S50 is performed. The second reflected light is incident onto the image sensor 40 through the optical unit 30, and the second electric image signal is thus generated by the image sensor 40.

Next, in the step S60, the image processing unit 70 is used to receive the first and second electric image signals, and the first electric image signal is converted to the two-dimensional plane image data, and the second electric image signal is subtracted by the first electric image signal to form the three-dimensional electric depth signal, which is further converted to the three-dimensional depth data. The two-dimensional plane image data represents the plane image sensed by the image sensor 40 for the target object 20. The plane image comprises a plurality of unit images, which can be color or gray level two-dimensional images dependent on the type of the image sensor 40 used. The three-dimensional depth data represents the depth and the relative depth for each unit image and the image sensor 40. The magnitude of the three-dimensional electric depth signal is inversely proportional to the relative depth by N powers of exponent, and N is any real number between 1 and 10. Specifically, as larger N is, the faster the three-dimensional electric depth signal is reduced as the relative depth increases. N can be set as actually desired. As described above, the active light source unit 50 is designed with a specific range of wavelength, covering at least one of visible, ultraviolet and infrared light. It may be worth noting that the three dimensional depth data is determined by the magnitude of the three-dimensional electric depth signal regardless of the specific range of wavelength.

Finally, in the step S70, the image processing unit 70 combines the two-dimensional plane image data and the three-dimensional depth data to form the three-dimensional image data for the target object 20.

Moreover, the active light source unit 50 can be further controlled by the image processing unit 70 to generate the active light 60, which actively illuminates the target object 20 in the active exposure interval. Also, the image processing unit 70 is used to accomplish the three-dimensional image data between two intervals of time for the active exposure. Therefore, it is possible to provide successive three-dimensional image data.

Additionally, in the step S30, it is necessary for the intensity of the active light 60 to take into consideration the configuration of the relative working distance (of the objects, light sources and camera) and the first electric image signal so as to avoid being too close to the upper limit of the brightness for the pixels of the image sensor. If the quality of color image is deteriorated, the post image treatment is needed to improve the quality of the output image according to the image quality desired. Therefore, it is possible to obtain both the depth image and the color image according to the features provided by above mentioned embodiments.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of taking pictures for generating three-dimensional image data, comprising steps of:

illuminating a target object with an environmental light to generate a first image reflected light reflected from said target object;

using a color image sensor to receive said first image reflected light through a non-movable optical unit;

generating a first electrical image signal by using said image sensor based on said first image reflected light, the first image is a complete frame;

using an active light source unit to generate an active light to illuminate said target object while said object is continuously illuminated by said environmental light, wherein said active light source unit receives a synchronized signal from said image sensor and is switched on/off based on the synchronized signal, and said target object reflects the illuminating lights to form a second image reflected light, and wherein said image sensor includes an pixel array and the built-in controller, and the built-in controller of said image sensor generates the synchronized signal, also said active light source unit is synchronized with the start and end points of time for the exposure of the image sensor, and said synchronized signal is a vertical synchronized signal;

using said image sensor through said optical unit to receive said second image reflected light including both reflected light from said active light and reflected light from said environmental light and generate a second electrical image signal, the second image is a complete frame;

transporting said first and second electrical image signals stored in a memory, wherein said first and second electrical image signals are digital signals;

using an image processing unit to receive said first and second electrical image signals, convert said first electrical image signal to a two-dimensional image data, and subtract said first electrical image signal from said second electrical image signal to generate a three-dimensional electrical depth signal, wherein said three-dimensional electrical depth signal is converted to three-dimensional depth data, wherein said two-dimensional image data represents a plane image of said target object sensed by said image sensor, said plane image comprises a plurality of unit images which are two-dimensional images with colors, and said three-dimensional depth data represents a depth or a relative depth between said image sensor and each of said unit images; and combining said two-dimensional image data and said three-dimensional depth data such that finally an output having a depth image together with a color image is thus obtained, wherein said active light unit has a flickering frequency less than a frame rate of said image sensor with a constant ratio specified as desired, said constant ratio being a real number from 0 to 1, but not 0 or 1, an integral of intensity of said active light within a second is substantially not changed after said constant ratio is specified, and said integral is proportional to said constant ratio; and wherein said active light includes a specific range of wavelength, and said three-dimensional electrical depth signal is converted to said three-dimensional depth data according to magnitude of said three-dimensional electrical depth signal independent of the specific range of wavelength, and the magnitude of said three-dimensional electrical depth signal is inversely proportional to said relative depth by N powers of exponent, N being 2, 4, 5, 6, 7, 8 or 9.

2. The method as claimed in claim 1, wherein said optical unit comprises an optical glass or lens, and said active light has a specific range of wavelength adapted to said optical unit to pass or be filtered.

3. The method as claimed in claim 1, wherein said active light comprises laser or light generated by light emitting diode (LED) with wavelength within a specific range, comprising at least one of visible, ultraviolet, and infrared light.

4. The method as claimed in claim 1, wherein said active light source unit is switched on/off according to appropriate start and end points of time to meet different specification and design for said image sensor, and said start and end points of time are derived from a synchronized signal related to said exposure of said image sensor.

5. The method as claimed in claim 1, wherein said active light source unit is controlled by said image processing unit to generate said active light.

6. The method as claimed in claim 1, wherein said active light source unit generates said active light according to said image sensor.

7. The method as claimed in claim 1, wherein said active light is a visible laser or light generated by light emitting diode (LED) with wavelength within a specific range.

8. The method as claimed in claim 1, wherein said active light is an ultraviolet laser or light generated by light emitting diode (LED) with wavelength within a specific range.

* * * * *